(12) United States Patent
Schopf et al.

(10) Patent No.: US 7,604,829 B2
(45) Date of Patent: Oct. 20, 2009

(54) PET FOOD PRODUCT AND METHOD OF PRODUCING SAME

(75) Inventors: Andreas Schopf, St. Joseph, MO (US); Michael G. Rayner, St. Joseph, MO (US); Luz Rayner, St. Joseph, MO (US)

(73) Assignee: Nestec S.A., Vevey (CH)

( * ) Notice: Subject to any disclaimer, the term of this patent is extended or adjusted under 35 U.S.C. 154(b) by 879 days.

(21) Appl. No.: 10/527,473

(22) PCT Filed: Sep. 11, 2003

(86) PCT No.: PCT/EP03/10089

§ 371 (c)(1),
(2), (4) Date: Mar. 11, 2005

(87) PCT Pub. No.: WO2004/023887

PCT Pub. Date: Mar. 25, 2004

(65) Prior Publication Data

US 2006/0013939 A1    Jan. 19, 2006

(51) Int. Cl.
*A23K 1/18* (2006.01)

(52) U.S. Cl. .............. 426/249; 426/513; 426/516; 426/518; 426/574; 426/646; 426/805

(58) Field of Classification Search ............ 426/249, 426/516, 518, 646, 574, 513, 805
See application file for complete search history.

(56) References Cited

U.S. PATENT DOCUMENTS

| 4,011,346 | A | * | 3/1977 | Ernst ................... 426/104 |
| 4,454,804 | A | | 6/1984 | McCulloch |
| 4,781,939 | A | * | 11/1988 | Martin et al. ............ 426/646 |
| 5,792,504 | A | * | 8/1998 | Poppel et al. ............ 426/646 |
| 6,146,679 | A | | 11/2000 | Heyhoe |
| 6,379,738 | B1 | | 4/2002 | May et al. |

FOREIGN PATENT DOCUMENTS

| EP | 0 818 154 A | | 1/1998 |
| JP | 2000 300236 | | 10/2000 |
| WO | 0170045 | * | 9/2001 |
| WO | 03/024240 A1 | | 3/2003 |

* cited by examiner

*Primary Examiner*—C. Sayala
(74) *Attorney, Agent, or Firm*—K & L Gates LLP (57) ABSTRACT

A pet food product is produced having a colored exterior that simulates the appearance of real meat that has been imparted a marinated or grilled appearance. The product may be manufactured using a vegetarian (meat free) formulation or a formulation combining meat with dry proteinaceous materials. The ingredients are processed to form an emulsion-like mixture, which is rapidly heated in a confined zone to allow the protein to coagulate. An injector/shredder assembly is positioned in the zone to disrupt and shred the coagulated product mass and inject a colorant. The colorant adheres to some of the exterior surfaces of the final product to create a simulated grilled or roasted appearance.

33 Claims, 6 Drawing Sheets

PET FOOD PRODUCT AND METHOD OF PRODUCING SAME

BACKGROUND OF THE INVENTION

This invention relates to the production of pet food products with a random colouring on the surface having a meat-like and, but not limited to, a roasted or marinated appearance and texture. Colourants are added to the exterior of the individual pieces of the product of the present invention to enhance the appearance of the food product.

Simulated meat products are well known in the pet food industry. Prior efforts directed to providing simulated natural meat chunks for pets are disclosed in U.S. Pat. No. 4,781,939. In this '939 patent, a meat emulsion is pumped through an emulsion mill where it is subjected to shearing to increase the fineness of the emulsion and almost simultaneously heat the emulsion to between about 104° C. to 118° C. The hot meat emulsion is then pumped by centrifugal force into a confined processing zone, sometimes referred to by those in the industry as a "hold tube". While passing through the elongated hold tube, protein coagulation of the emulsion proceeds at a rapid rate. One or more pinch valves could be positioned in the hold tube to control flow. A cutting means was mounted at the discharge end of the elongated hold tube to cut the coagulated product into pieces of a desired size, e.g. from about 1.2 to 5 cm or more. The '939 patent describes the finished product as being formed into discrete pieces or chunks having a distinct layered structure which simulates pieces of natural meat in texture and appearance.

International Publication No. WO 01/35766 presents other efforts to produce a meat emulsion product with a meat like appearance. FIG. 2 of this International Publication is a photograph of the meat emulsion product produced in accordance with the teachings of this prior art disclosure. As can be seen in the photograph, the product has a plurality of elongate strands of fibers that are generally linearly arranged in bundles. To some, the end product resembles pulled pork. The Publication itself describes the appearance as tender slow cooked chicken or turkey that has been hand-pulled from the bone and covered in its own broth/juice. The product in this prior art disclosure is produced in a hold tube that defines a confined processing zone. Prior to entering the hold tube the emulsion is pumped through an emulsion mill in which the emulsion is subjected to shearing to increase the firmness of the emulsion and almost simultaneously heat the emulsion to between about 120° to about 163° C.

Other efforts have been made to improve the appearance of emulsion products, especially in the field of pet treats and pet foods. For example, Alpo® Prime Treats are soft treats shaped like little T-bone steaks with a series of parallel dark marks on the top of the treat that give the appearance of grill marks such as those imparted from the hot bars or hot rungs of an outdoor barbecue grill or the grate of any other type of grill. This appearance is imparted to the pet treat by a hot element that actually sears a plurality of parallel dark marks into the surface of the treat.

Despite these and other efforts, there is still a need for pet food products with improved appearance. There is still a need for an easier and more economical way to impart a simulated grilled or marinated appearance to pet food products.

SUMMARY OF THE INVENTION

Pet food products having the form of solid, meat-like chunks, are produced using the production process of the present invention. The products of the present invention have a base colour and random colouring on some exterior surfaces which simulates a roasted or grilled appearance that is desirable to consumers. The roasted or grilled appearance is achieved through the addition in situ of colourants to some exterior surfaces of the product during the production process, not through the direct application of a heating element to the product.

Thus, according to a first aspect of the invention, a pet food product comprises individual pieces of a food product mass having a base color and a contrasting exterior color that simulates grill marks on natural meat that has been chopped into irregularly shaped individual pieces prior to serving.

In a preferred form of the invention, the said pieces consist of a solidified emulsion comprising at least one of a meat source, a dry proteinaceous source and a vegetarian food source.

In a further preferred form of the invention, the exterior color comprises a colorant selected from the group consisting of water-soluble colorants and oil-soluble colorants. The colorant preferably adheres to the emulsion without the presence of a binder.

In a still further preferred form of the invention, the colorant is negatively charged with respect to said product mass pieces to promote adhesion of said colorant to said pieces.

Preferably, the pieces comprise less than 15% fat by weight.

Preferably, the pieces have a moisture content from about 50% to about 65% by weight.

According to a second aspect of the invention, there is provided process for producing a pet food comprising:
mixing a protein source to produce an emulsion;
heating said emulsion above the boiling point of water;
pressurizing said emulsion in a confined pressurized zone;
coloring said emulsion in said confined pressurized zone; and
discharging said emulsion in discrete pieces or chunks of pet food.

The protein source may comprise at least one of a vegetable source, a meat source, and a meat by-product source.

The vegetable source may comprise at least one of a soy source, a corn source, a rice source, a peanut source, a sunflower source, a linseed source, a canola source and a wheat source.

The meat source may comprise at least one of a beef source, a chicken source, a fish source, and a pork source. In an embodiment, the meat source contains from about 15% to about 25% fat by weight. In an alternative embodiment, the meat source contains less than 15% fat by weight.

In an embodiment, the process results in a product that simulates marinated or grilled beef that has been chopped into irregular chunks. Some portions of the exterior surface are darker than the underlying base colour of the product, giving a simulated grilled or marinated appearance.

In an embodiment, the exterior coloration is added by means of an injector/shredder assembly at the time of formation of the solid body during the production process. The invention can also be used to produce products with some exterior surface colouration that simulate grilled fish or chicken. Furthermore, the invention can be used with vegetable protein sources to simulate a variety of coloured meat products.

A serving of the product produced by this invention has a number of individual pieces with different shapes and sizes that closely simulate natural meat that has been cooked and chopped prior to serving. The size range of the individual chunks is variable, but they typically include small, medium and larger chunks in each serving, with some individual pieces falling intermediate of these three general classes.

Furthermore, a majority of the individual pieces tend to have irregular surface contours over at least a portion of the chunk. Some individual pieces may have one or more flat surface contours due to being resized by cutting equipment, which causes the flat cut surface. The overall appearance of the end product produced by this invention is a variety of individual pieces of different shape, one from the other and most of the individual pieces also having irregular exterior surface contours to closely simulate natural meat products that have been chopped and grilled or pan fried prior to serving. The colourant causes many of the individual pieces to have a portion of the exterior surface darkened as though seared, for example, on an outdoor barbecue grill or any grill with a hot grate that imparts sear marks or dark marks to the piece by burning the surface. Nevertheless, the colouring is not limited to providing a grilled appearance, but may also be used to add a distinctively different coloured layer on the surface of a food product, such as typically provided by a marinade.

Thus, according to a third aspect of the invention, a pet food product is provided, that has an underlying base colour throughout the product and a contrasting exterior colour that simulates grill marks on natural meat that has been chopped into chunky, irregularly-shaped, individual pieces prior to serving, the pet food product comprising a mixture of (1) first individual pieces having a single base colour on their exterior surface (2) second individual pieces having a portion of their exterior surface bearing the contrasting colour, a minor portion of the second pieces having the contrasting colour on substantially all of their exterior surface.

In an embodiment, the present invention provides for an emulsion product in the form of individual pieces that vary in size and have irregular exterior surface contours that closely resemble a piece of natural meat in appearance, texture, and consistency. After forming, the emulsion mass is fragmented and custom-coloured while still in situ in the confined processing zone. This contributes to forming the individual pieces that vary in size and have irregular exterior surface contours and colouration. The disruption of the emulsion mass in the confined processing zone is achieved by the injection of steam and/or by mechanical means. For example, a combination injector/shredder assembly may be positioned in the confined processing zone to disrupt the emulsion mass and to inject colours which adhere to some of the exterior surfaces of the product.

In an alternative embodiment, a separate injector assembly for the exterior colourants could be located upstream or downstream of a separate fragmenter device or shredder assembly. The shredder assembly comprises means for disrupting the continuity of the structure of the emulsion as it coagulates. In an embodiment, the shredder assembly comprises a series of baffles in the holding tube. In an alternative embodiment, the shredder assembly comprises a grid of elements orientated generally transversally to the direction of flow within the confined processing zone. The fragmenter device or shredder assembly may thus be a simple arrangement of blades, baffles wires and/or bars to fragment, disrupt and/or shred the product mass while passing through or around this assembly. The injector assembly can be a simple pipe with holes or nozzles to inject colourants.

The meat emulsion chunks of this invention are suitable for use as a partial or complete replacement for more expensive natural meat chunks in animal foods, that retain their integrity and shape when subjected to commercial canning and sterilization procedures such as those required in the production of canned high moisture food products. The emulsion product of the present invention may also be placed in any sterilizable package or container.

The appearance of the present pet food product is enhanced by the addition of a colourant to the product while it passes through the confined processing zone. This colouring gives portions of the irregular exterior surface, but typically not the entire exterior surface of an individual piece, a darkened appearance which simulates application of a marinade or grilling of the product on an outdoor barbecue grill or any grill with a hot grate that imparts dark sear marks to food. For example, if a piece of real chicken breast were cooked on a grill, portions of the exterior would be darker than the interior. After cooking, being placed on a plate and cut into smaller individual pieces, some of the cut pieces of this real chicken would have perhaps one exterior surface that is relatively dark and the other interior surfaces would be relatively light. Other cut pieces of this real grilled chicken might not have any darkening on any surface. This irregular colouring of a portion, but typically not the entire surface of an individual piece, more closely simulates grilled natural meat products than the prior art. In the present invention, some of the individual pieces of the emulsion product may not have any colouring on the exterior surface, others may have a portion, but not all of the exterior surface coloured and a few pieces may have colouring on substantially all of the exterior surface. This random colour scheme that darkens some exterior surfaces of the finished product closely simulates a piece of natural meat that has been grilled, seared or otherwise darkened on a portion of the exterior and then chopped before serving.

Pet foods produced according to this invention that use meats and dry proteinaceous materials typically form an emulsion product. Vegetarian (meat-free) products produced according to this invention may or may not form an emulsion depending on the amount of lipids in the product. References hereinafter to emulsion products should therefore be understood to refer to any of the above situations. The pet food of the present invention is produced by a process which includes comminuting a mix of meat material, such as meat (including fish and poultry) and/or meat by-products, and/or vegetable protein under conditions which form an emulsion, or a low fat vegetable protein blend. One or more dry proteinaceous materials may, if desired, be included in the emulsion/blend to increase the protein content, particularly if the meat mix contains a relatively large proportion of low binding or filler meats. The emulsion is comminuted under conditions which concurrently increase emulsion fineness and rapidly heat the emulsion to a temperature above the boiling point of water, and preferably between about 104° C. to about 118° C., at which temperature coagulation and denaturing of protein in the emulsion proceeds at a very rapid rate. The hot emulsion is immediately pumped by centrifugal force from the comminuting equipment directly into a confined processing zone, such as an elongated hold tube, while maintaining the emulsion mix at a pressure above the vapor pressure of the mix. The emulsion is retained in the confined processing zone ("CPZ") under such pressure until the protein has coagulated to an extent to set the emulsion and form a firm emulsion product, that is, within 5 minutes and generally for between a few seconds to about 3 minutes. The shredder assembly disrupts the emulsion product in the zone. Liquids that include colourants are injected proximate the shredder assembly.

Pressure at the downstream end of the confined processing zone is reduced to a value below the vapor pressure of the emulsion, thereby generating steam in situ in the emulsion. The presence of steam generated in the confined emulsion mass by the vaporization of water serves to further disrupt the emulsion mass into irregular individual chunks or pieces which are discharged from the tubular processing zone. Further sizing and chopping can occur to selected individual pieces downstream of the hold tube, depending on the intended use of the product.

The pet food of the present invention has an appearance, texture and structure which closely simulates natural grilled or roasted meat chunks. The food product produced by this process may be used as a partial or complete replacement for natural meat chunks in a variety of animal foods. These animal food products may be prepared by canning and retorting operations and/or they may be placed in any sterilizable package or container.

DETAILED DESCRIPTION

Figure 1:
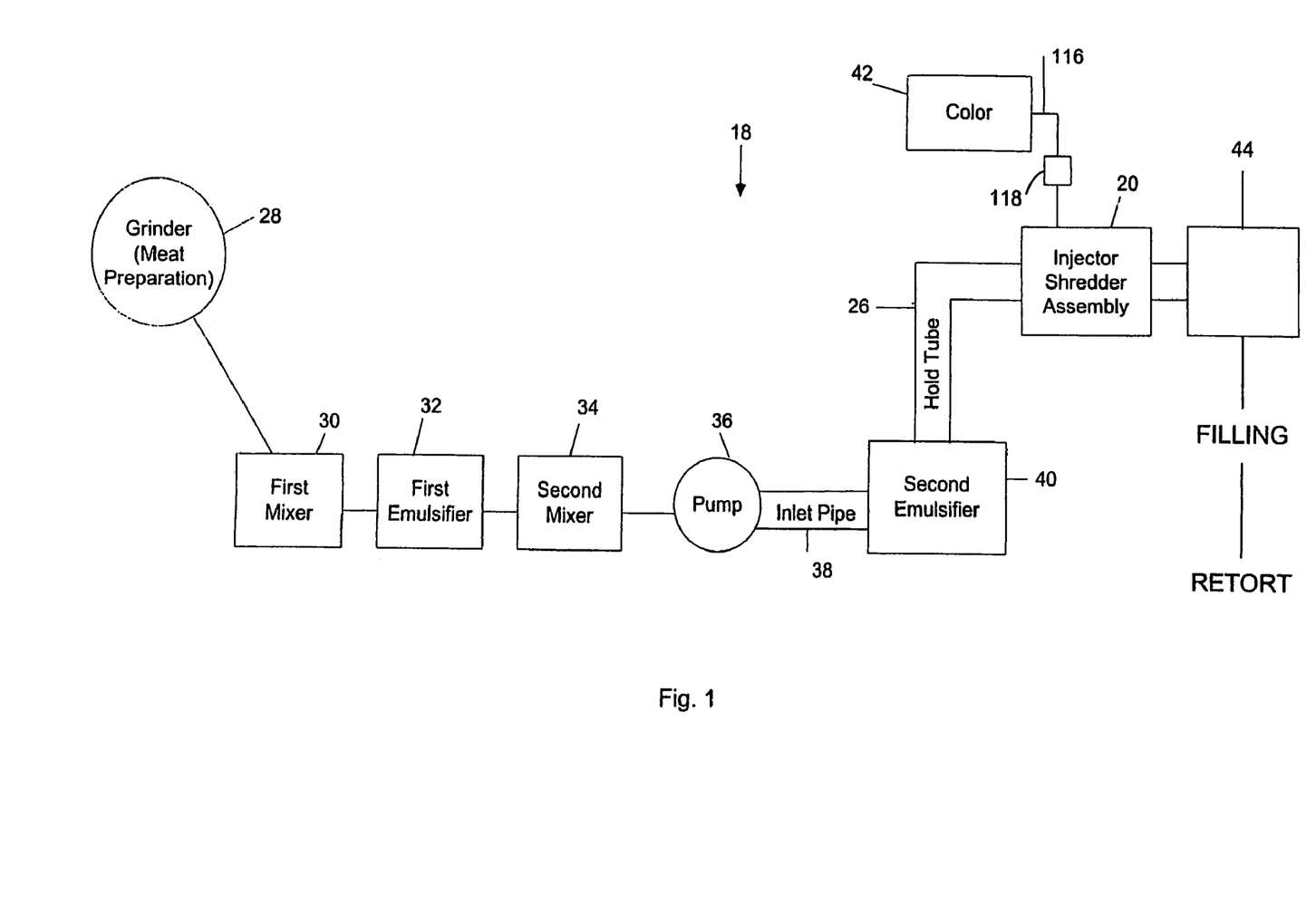
FIG. 1 is a schematic view of a food production process according to the present invention.

Referring to the drawing in greater detail, FIG. 1 illustrates a food production process and apparatus 18 including an injector/shredder assembly 20 constructed in accordance with a preferred embodiment of the present invention. The food production apparatus 18 is operable to produce a food product for pets. The injector/shredder assembly 20 is located in a hold tube 26 of the food production apparatus 18 and is operable to disrupt the food product inside the hold tube 26 to obtain an improved food product and to inject liquid colourants. The food production process can begin with meats and/or vegetable protein sources. The process will first be explained using meats.

In preparing pet food chunks in accordance with the method of the present invention, a mixture of vegetable protein sources and/or natural meat materials, including both meat from mammals, fish or fowl and/or meat by-products, having the requisite quality, ingredient cost and palatability, is formulated, ground and, in the case of there being sufficient fat present, as with meat protein containing fat, emulsified. The vegetable protein sources and/or meat and/or meat by-products used may be selected from a wide range of components, with the type and amount of meat material used in the formulation depending on a number of consideration such as the intended use of the product, the desired flavor of the product, palatability, cost, availability of ingredients, and the like. Vegetable protein sources could be from, but not limited to, soy, corn, rice, oil seed meals (for example, peanut, sunflower, linseed or canola) and wheat. Both meat (i.e. skeletal tissue and non-skeletal muscle) from a variety of mammals, fowl and fish, and/or meat by-products (i.e. the non-rendered clean parts, other than meat, derived from slaughtered mammals, fowl or fish) may be used as the meat material. Thus, the term meat material as used herein is understood to refer to dehydrated and non-dehydrated meat and/or meat by-products, including frozen materials. The meat mix may contain whole carcass meat, carcass portions or meat by-products approved for use in animal foods, such as mechanically deboned beef, chicken or fish, beef and pork liver, lungs, kidney, and the like. Typically the meat material is formulated to contain a maximum of about 25%, and preferably below about 15%, by weight of fat.

Additives which are used in conventional meat emulsion products may be mixed with the meat material and included in making a base meat emulsion, such as salt, spices, seasoning, sugar, and the like in amounts sufficient to provide the product with desired taste characteristics. In addition, minor amounts of other dry ingredients such as, for example, vitamins, minerals, flavors, and the like, may also be added to the meat emulsion. One or more dry proteinaceous materials, such as, for example, wheat gluten, soy flour, soy protein concentrate, soy protein isolate, egg albumin and nonfat dry milk, may also be included in the base meat emulsion to improve emulsion stability and binding, impart flavor, and reduce formulation costs. The inclusion of the dry proteinaceous materials in the emulsion is particularly advantageous in the production of product intended for use as a pet food, for it enables the processor to use meat materials having a protein to fat ratio and myosin to total protein ratio which would otherwise be of marginal acceptability for use in preparing meat emulsion products. If a dry proteinaceous material is included, the meat component may range from about 60% to about 95% by weight and all of the dry proteinaceous components may range from about 40% to about 5% by weight of the total emulsion. Generally, as the fat content and moisture content of the meat material used are increased, the level of dry proteinaceous material in the emulsion is increased accordingly. The emulsion may be given a desired base colour by the inclusion of a suitable reliable base colourant material such as iron oxide—red or yellow.

While the formulation of the emulsion may vary widely, the emulsion, including the dry proteinaceous material, should have a protein to fat ratio sufficient to form a firm emulsion product upon coagulation of the protein with no sign of emulsion instability, and the protein content of the emulsion must be such as will enable the emulsion, upon being heated to a temperature above the boiling point of water, to coagulate and form a firm emulsion product within a short period of time, that is, within about 5 minutes, and, preferably within 3 minutes, after being heated to such a temperature. Thus, the meat materials and the additives, including the dry proteinaceous material (if used) are mixed together in proportions such that the meat material is present in an amount of between about 55% to 95% by weight, and preferably from about 65% to 85% by weight of the meat emulsion, with the meat emulsion having a protein to fat ratio of at least about 1.5:1, with a protein to fat ratio of between about 2:1 to 7:1 being preferred. While a higher protein to fat ratio may be used in the meat emulsion, it is generally not preferred since it would increase ingredient costs without providing any significant benefits. It is generally preferred to use a blend of meat and meat by-products as the meat material in the meat emulsion. However, the meat emulsion may be formulated using only meat by-products as the meat material, provided that the resulting meat emulsion, including the dry proteinaceous material (if used), has a protein to fat ratio of at least about 1.5:1.

In addition, the meat emulsion should be formulated to contain between about 45% to 80% by weight moisture, with the moisture content preferably being controlled between about 50% to 75% by weight of the meat emulsion, i.e. the meat materials and additives. The exact concentration of water in the emulsion will, of course, depend on the amount of protein and fat in the emulsion.

The meat mix selected for use is passed through a grinder to reduce the meat material into pieces of substantially uniform size. Generally it is preferred to pass the meat through a grinder equipped with a 1 cm or smaller grinding plate. While satisfactory results may be obtained by grinding the meat to a particle size larger than 1 cm, the use of such larger meat particles is generally not preferred. If the meat materials to be used are in a frozen condition, they must first be prebroken or cut into pieces in order to reduce the size of the pieces going into the grinder. While the size of the pieces will depend on the size of the meat grinder intake, normally the frozen meat material is cut into pieces about 10 cm square.

After grinding, the mix of meat particles is conveyed to a holding tank in which the meat mix preferably is heated to a temperature of between about −1° C. to 7° C., such as by hot water jacketing, steam injection, and the like to facilitate pumping of the meat mix.

The mix of ground meat particles is then comminuted under conditions, which emulsify the meat material and form a base meat emulsion in which the protein and water of the meat mixture form a matrix that encapsulates fat globules. The meat material may be emulsified by any conventional procedure and equipment commonly used in meat emulsification such as by using a mixer, blender, grinder, silent cutter chopper, emulsion mill, and the like which is capable of breaking up and dispersing the fat as globules in the protein slurry to form an emulsion. Typically the temperature of the meat emulsion increases during the emulsification process. This heating of the meat emulsion is not objectionable as long as the temperature does not increase to the point that protein denaturation begins to occur at an undesirable rate at this stage of the process. The temperature of the meat mixture during emulsification should be maintained below about 49° C. in order to minimize protein denaturing at this stage of the process. According to a preferred embodiment of the invention, the meat material is passed through an emulsion mill to emulsify the meat material with the emulsion being heated to a temperature between about 10° C. to 49° C., preferably between about 35° C. to 46° C.

The additives to be incorporated in the meat emulsion, including dry proteinaceous material (if used), may be added to the meat mix prior to emulsification. Alternatively, it is frequently preferable to incorporate the additives, particularly the dry proteinaceous material, in the meat mix after emulsification of the meat. Since the addition of the dry proteinaceous material increases the viscosity of the emulsion, better emulsification is obtained when the meat mix is emulsified before the addition of the dry proteinaceous material, which results in the formation of a viscous meat emulsion.

The viscous meat emulsion thus obtained by inclusion of the dry proteinaceous material in the emulsion preferably is then deaerated by any conventional procedure such as by processing it through a vacuum stuffer, to remove occluded air which could disrupt the product matrix and reduce its binding capacity.

The meat emulsion is again comminuted to increase the fineness of the emulsion and is rapidly heated to a temperature above the boiling point of water, at which temperature the coagulation of protein in the emulsion proceeds so rapidly that the emulsion is set and a firm emulsion product formed within a very short period of time. It has been found that rapidly heating the viscous meat emulsion to a temperature above the boiling point of water, and generally between 104° C. and 118° C., will result in the protein in the emulsion coagulating to set the emulsion and form a firm emulsion product within about 5 minutes and typically from a few seconds to about 3 minutes after heating. In addition, heating the meat emulsion, which has a moisture content of about 45% to 80% by weight, to such temperature results in vaporization of the emulsion water to form steam in the body of the emulsion mass when it is at or near atmospheric pressure. Preferably the emulsion is processed in equipment in which the emulsion is heated to such elevated temperatures while it is being comminuted such as by mechanical heating. According to a preferred embodiment, the viscous meat emulsion, which is at a temperature of between about 30° C. to 40° C. is pumped through an emulsion mill in which the meat emulsion is subjected to shearing to increase the fineness of the emulsion and almost simultaneously heat the emulsion to between about 104° C. to about 118° C. through rapid mechanical heating. Thus, the emulsion preferably is heated to such elevated temperatures in a period of less than about 60 seconds.

Control of the emulsion temperature within the desired range can be effected adjusting such factors as the feed rate into the emulsion mill, the rotational speed of the emulsion mill, and the like, and can readily be determined by those skilled in the art.

The hot meat emulsion, which is at a temperature above the boiling point of water and preferably in the range of between about 104° C. to 118° C., is pumped under positive pressure through the equipment in which it is comminuted and heated into a confined processing zone, which preferably is in the form of an elongated tube, and is retained in the confined processing zone at a pressure above the vapor pressure of the emulsion until a firm product forms by coagulation. To obtain formation of individual pieces with irregular exterior surface contours, an injector/shredder assembly is placed in the hold tube to promote disruption and cutting of the emulsion. In an alternative arrangement, the shredder assembly may be separate from the injector assembly. The shredder assembly comprises disruption means to disrupt the continuity of the structure of the coagulated emulsion. The disruption means may comprise an object placed in the flow stream and around which the emulsion is forced to divide in order to continue moving toward the discharge end of the hold tube. Thus it may be a grid of cutting elements generally disposed transversally to the direction of material flow in the hold tube. Alternatively, or in addition, it may comprise a series of baffles. In another alternative embodiment, the disruption may be accomplished with the injection of steam into the hold tube.

Because of the injector/shredder assembly the product is disrupted in the confined processing zone to enhance formation of individual pieces with irregular exterior surface contours and colour is added. At the elevated temperature in the tube, protein coagulation proceeds at a very rapid rate while the desired colour is imparted to some exterior surfaces of the product. The period of time required for the hot emulsion to set sufficiently to form a firm product will depend on a number of factors, such as the temperature to which the emulsion is heated and the amount and type of protein in the emulsion. A residence time of between a few seconds to about 3 minutes, and usually between about 1 to 1.5 minutes, in the elongated tube is generally sufficient for the protein to coagulate sufficiently. The residence time in the elongated tube can be controlled by adjusting the flow rate of the emulsion to the elongated tube and/or by adjusting the length of the elongated tube. The dimensions of the holding tube are not critical but must be sufficient to provide the emulsion with sufficient retention time in the tube for the emulsion to set. In practice, tubes having a length of between about 3 m and about 25 m and an internal diameter of between about 4 cm and about 60 cm provide sufficient retention time to form the emulsion product. Tubes of various cross-sectional shapes may be used, such as circular, square, octagonal, and the like.

An injector/shredder assembly is positioned to inject liquids containing colourant(s) into the emulsion while in the hold tube. Colourants are ingredients, which naturally impart colour to a food product. Colourants, useful with the present invention include, but are not limited to, caramel colour. Other brownish shades ranging to black may be utilized. Water-soluble or oil-soluble colourants may be suitable for use in this invention. The colourant is mixed in an aqueous solution prior to contact with the food product. The aqueous solution is from about 30% to about 60% colourant by weight and from about 70% to about 40% water by weight. Other flavors and/or nutritional ingredients may also be added to this aqueous solution. In order to affix the colourant to the food product passing through the elongated hold tube, the aqueous colourant solution should have an opposite electrical charge to the food product. Because products containing meat have a naturally occurring positive charge, it is useful to use colourant with a negative charge, but it is sufficient that the charges be opposite. It is within the scope of this invention to have a negatively charged product mass and a positively charged colourant.

In the case of caramel colours, these fall into four general Classes, depending on the method of production. Caramel colour Class 1 is slightly negative, Class 3 caramel colour is positively charged whereas Class 2 and 4 are negatively charged. If the food product has a overall positive charge, Class 2 and 4 and, to a lesser extent, Class 1 caramel colour are suitable, whereas positively charged caramel colours will be useful if the food product has an overall negative charge.

Caramel colour BC 145 (commercially available from Sethness Products Co. of Chicago, Ill.) is a Class 4 colour that is negatively charged and is suitable for use in this invention. Caramel Colour 111 (commercially available from DD Williamson, Louisville, Ky.) is also a Class 4 caramel colour that is negatively charged and is suitable for use in this invention. Numerous other charged caramel colours are commercially available and may be suitable for use in this invention. Applicants believe that it is unknown to fix colour on a food product using opposing charges without the presence of a binder. In contrast, it is common in the food industry to use a protein source, such as a coloured batter, to surround and impart colourants to a product. The colourant used in this invention should not be applied to the individual pieces of product after they have exited the hold tube.

The effect of the combination of pumping the hot emulsion into the tubular processing zone by centrifugal force, subjecting the hot confined emulsion to disruption from the injector/shredder assembly 20 while the protein is coagulating at a rapid rate and injecting colour, together with the pressure exerted on the emulsion by pumping it through a confined zone and the internal generation of steam in the hot confined emulsion, serves to disrupt the meat emulsion mass and facilitate formation of individual pieces with irregular surface contours which, by virtue of the steam pressure, are rapidly discharged, already coloured, from the tubular processing zone into atmospheric conditions.

The set pieces discharged from the confined processing zone are in the form of discrete pieces or chunks having a temperature of about 98° C.-100° C., and a moisture content of about 50% to 65%, with the pieces varying in size, shape and colouration. Upon discharge from the processing zone, the pieces are rapidly cooled by evaporative cooling to a temperature in the range of 83° C.-93° C. If desired, suitable cutting means, such as a rotary cut-off knife, a water jet knife, a knife grid, or the like may be mounted at the discharge end of the elongated tube to cut the chunks into pieces of a desired size, e.g. from about 0.2 cm to 5 cm or more. The meat emulsion chunks thus formed have excellent integrity and strength and will retain their shape when subjected to commercial canning and retorting procedures such as those required in the production of canned foods having a high moisture content.

The meat emulsion pieces discharged from the confined processing zone may be conveyed to a dryer to remove a large portion of the moisture therefrom, and the dried product collected and stored. Alternatively, the meat emulsion pieces may be conveyed from the elongated tube directly to a canning operation in which layered chunks are filled into cans or pouches together with other ingredients, such as sauce, gravy, and the like, and the cans retorted. For example, in the production of a canned pet food product, a suitable gravy may be prepared by heating a mixture of water, starch (or gums) and condiments. The meat emulsion chunks and gravy are filled into sterilizable packages or containers in the desired proportions, the packages or containers are vacuum sealed and are then retorted under time-temperature conditions sufficient to effect commercial sterilization. Convention retorting procedures may be used. Typically, a retorting temperature of about 118° C.-121° C. for approximately 45-90 minutes is satisfactory in producing a commercially sterile product.

Referring to FIG. 1, the food production process 18 begins with meat preparation utilizing a grinder 28. Various kinds of frozen meat are ground into small pieces and mixed in a first mixer 30 in desired ratios as set forth in the examples given below. Other dry ingredients such as vitamins, and minerals are also added at this mixing step if desired. The first mixing process can be continuous or by batch. The mixed food product is then passed to a first emulsifier mill 32, which is operable to heat and emulsify the food product. The emulsified food product is then passed to a second mixer 34, and the food product is mixed with major dry proteinaceous material in amounts set forth in the examples given below. The second mixer 34 preferably operates on a continuous basis but can operate with batches of food product. The food product is then passed, preferably by a pump 36, to an inlet pipe 38 for a second emulsifier mill 40. In the inlet pipe 38, the food product is approximately 40° C. at a pressure in the range of approximately 2.1 kg/cm$^2$ to approximately 4.2 kg/cm$^2$. The food product is emulsified by the second emulsifier mill 40, which is preferably a Siefer Mill, and the food product is passed to the hold tube 26 at a pressure in the range of approximately 4.2 kg/cm$^2$ to approximately 8.4 kg/cm$^2$ and a temperature in the range of approximately 104° C. to approximately 118° C. and preferably 110° C. Under the desired temperature and pressure conditions in the hold tube 26, the food product starts to rapidly coagulate.

As the food product passes through the hold tube it passes through the injector/shredder assembly 20. The total length of the hold tube could be between about 3 m to about 25 m, and the length of the hold tube leading up to the injector/shredder assembly 20 is between approximately 10-70% of the length of the hold tube. The preferred length of the hold tube leading up to the injector/shredder assembly 20 is approximately between 15 and 20% of the length of the hold tube. The injector/shredder assembly then disrupts and cuts the food product and injects liquid colourants. A liquid, including colourants contacts and adheres to the food product, which darkens a portion of the product simulating the appearance of being grilled. The colour solution is affixed to the food product by forces of electrical attraction. The food product and the colour solution have opposite charges. Thus, the colour solution bonds to the food product without additional binders. The liquid 17 is provided by a metering pump 42, which transmits the liquid to the injector/shredder assembly 20. The pump 42 should have an output pressure that is higher than the pressure in the hold tube 26 and a flow rate of from about 1% to about 20% by weight of the product flow and preferably about 3%. So for example, if 100 kg of product is passing through the hold tube per minute, the liquid 17 should be injected through the injector/shredder assembly at between about 1 kg per minute to about 20 kg per minute.

The pump 42 could be a positive displacement pump or any other type of pump that provides sufficient output pressure to exceed the pressure in the hold tube 26, avoid plugging and provide a sufficient flow rate of colourants from a reservoir, not shown, to the injector/shredder assembly 20. In an alternative embodiment, an injector assembly, not shown, may be separate from a fragmenter/shredder assembly, not shown. In this alternative embodiment, not shown, the pump 42 delivers the colourant solution to the separate injector assembly which injects colourants into the product mass as it passes through the hold tube 20. In this alternative embodiment, not shown, the injector assembly may be upstream or downstream of the separate fragmenter/shredder assembly. The fragmenter/shredder assembly disrupts, fragments, and shreds the product mass as it passes through and/or around this assembly in the hold tube.

When the food product exits the hold tube 26, it is further cut into individual pieces by an end of tube cutting apparatus 44 after being exposed to atmospheric pressure. Exposure to atmospheric pressure at the desired boiling temperatures causes the food product to flash. Specifically, the food product rapidly expands. In combination, the disruption and cutting of the emulsion by the injector/shredder assembly 20, the flashing to atmospheric pressure at the discharge end of the hold tube 26 and final cutting into individual pieces gives a random irregular surface contour to many of the individual pieces. Due to the colour solution, which has been added to the product, a few of the individual pieces will have colour on the entire exterior surface, other individual pieces will have no colour on the exterior surface, but many of the individual pieces will have one or more exterior surfaces, but not the entire exterior surface, darkened by the colour giving a grilled appearance to such pieces. In the preferred embodiment of the finished product with colour, from about 10% to about 80%, and preferably from about 40% to about 50% of the individual pieces will have one or more exterior surfaces, but not the entire exterior surface, darkened by the colour giving the finished product the appearance of fresh meat that has been grilled and cut into smaller pieces.

The cutting apparatus 44 may typically be a rotary cutter. Pieces in the desired size range pass to a tumbler where they may be mixed with gravy from a gravy supply. After the meat and gravy are mixed, the combination is passed to the filler, which packages the product in cans, pouches or other containers. Packaging the pieces in a transparent container, without gravy being added, enables the grilled or pan-fried appearance of the product pieces to be advantageously exhibited.

Figure 2:
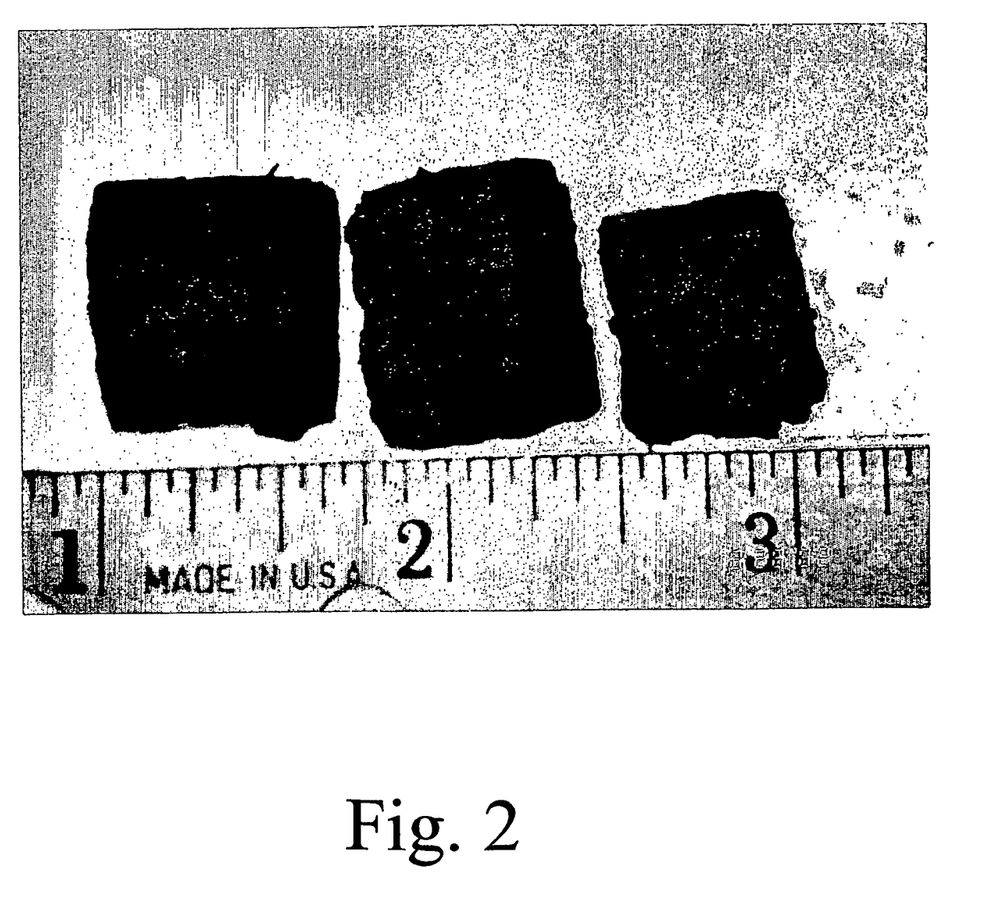
FIG. 2 is an enlarged photograph of a prior art pet food. The pet food in FIG. 2 has been produced using some of the teachings of the '939 patent and has been marketed under the brand Mighty Dog® pet food by Nestle Purina PetCare Company of St. Louis, Mo.

FIG. 2 is an enlarged photograph of a prior art pet food. The pet food in FIG. 2 has been produced using some of the teachings of the '939 patent and has been marketed under the brand Mighty Dog® pet food by Nestlé Purina PetCare Company of St. Louis, Mo. The colour of the pet food is generally uniform throughout the individual chunks. The shape of the individual chunks is also generally uniform with few irregular exterior surfaces.

Figure 3:
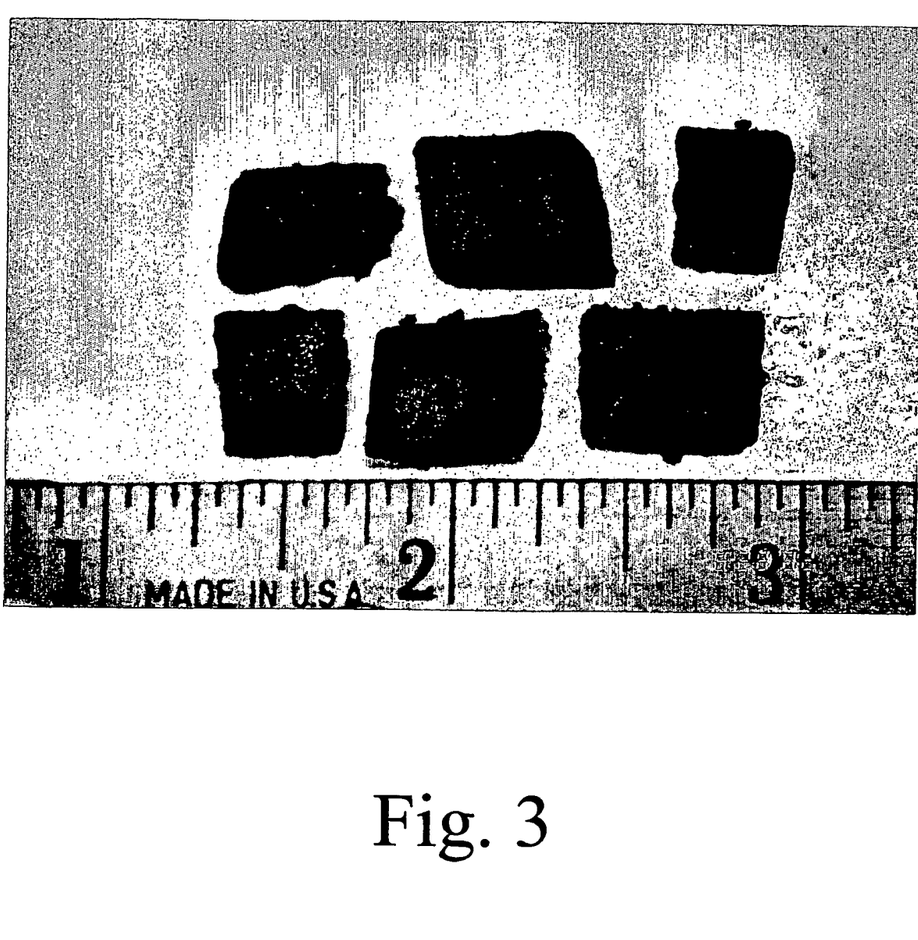
FIG. 3 is an enlarged photograph of a prior art pet food. The pet food in FIG. 3 has been produced using some of the teachings of the '939 patent and has been marketed under the brand Friskies® pet food Nestlé Purina PetCare Company of St. Louis, Mo.

FIG. 3 is an enlarged photograph of a prior art pet food. The pet food in FIG. 3 has been produced using some of the teachings of the '939 patent and has been marketed under the brand name Friskies® pet food by Nestle Purina PetCare Company of St. Louis, Mo. The base colour of the pet food in this photograph is generally uniform throughout the individual chunks. The shape of the individual chunks is also generally uniform with few irregular exterior surfaces.

Figure 4:
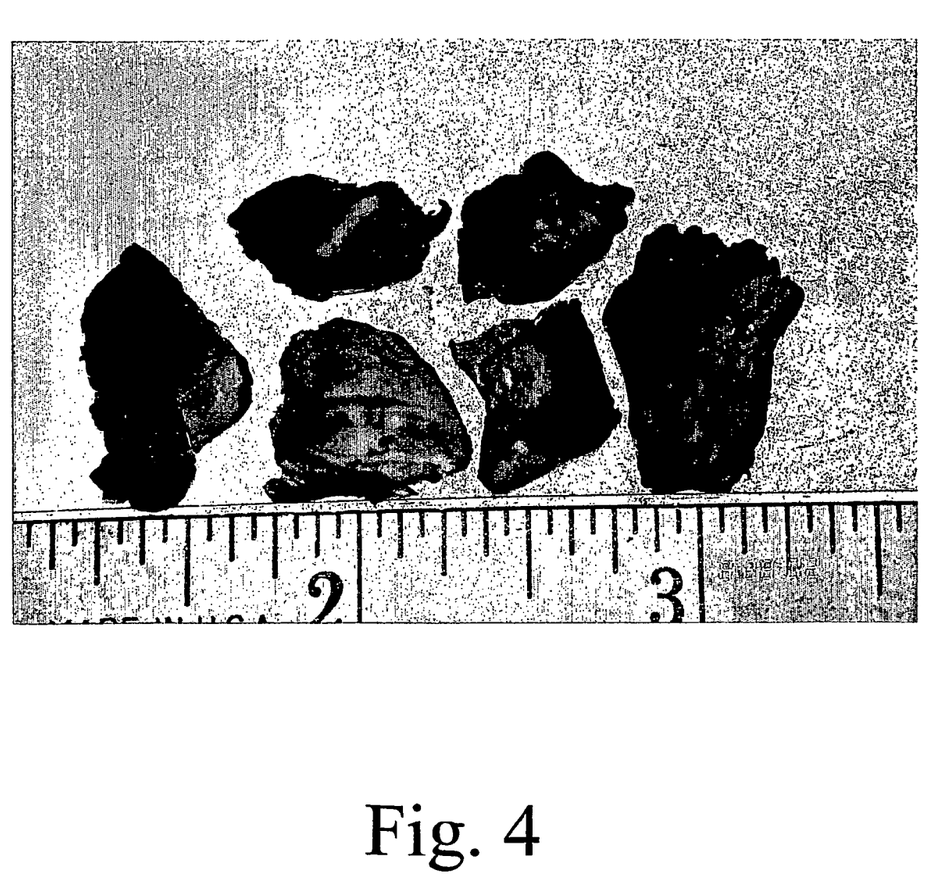
FIG. 4 is an enlarged photograph of a pet food of Example 1 of the present invention. The product is intended to simulate a piece of meat that has been grilled and then chopped. In other words, the product has simulated grill marks, which are dark surfaces on the exterior of some chunks.

FIG. 4 is an enlarged photograph of the pet food of Example 1 of the present invention. The product is intended to simulate a piece of meat that has been grilled and then chopped. The base colour of the pet food in this photograph is generally uniform throughout the individual chunks, except there are dark exterior surfaces on some of the chunks, which simulates grill marks.

Figure 5:
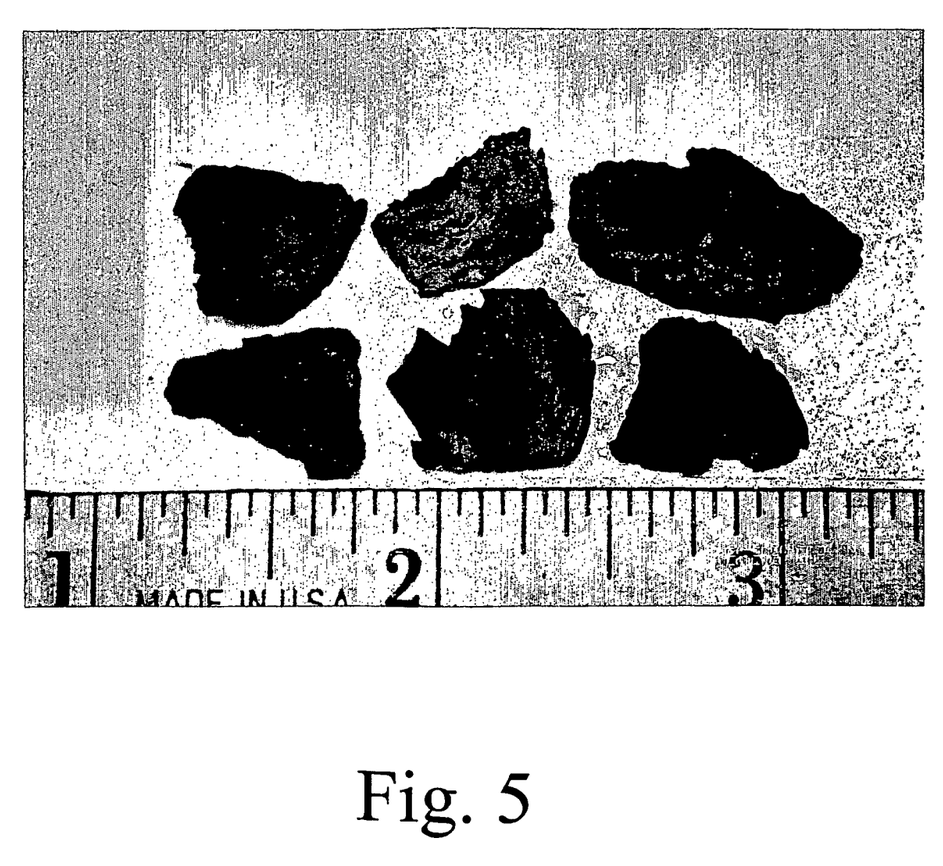
FIG. 5 is an enlarged photograph of a pet food of Example 2 of the present invention. The product is intended to simulate a piece of natural fish that has been grilled and then chopped. In other words, the product has simulated grill marks, which are dark surfaces on the exterior of some chunks.

FIG. 5 is an enlarged photograph of a pet food of Example 2 of the present invention. The product is intended to simulate a piece of natural fish that has been grilled and then chopped. The base colour of the pet food in this photograph is generally uniform throughout the individual chunks, except there are dark exterior surfaces on some of the chunks, which simulates grill marks.

Figure 6:
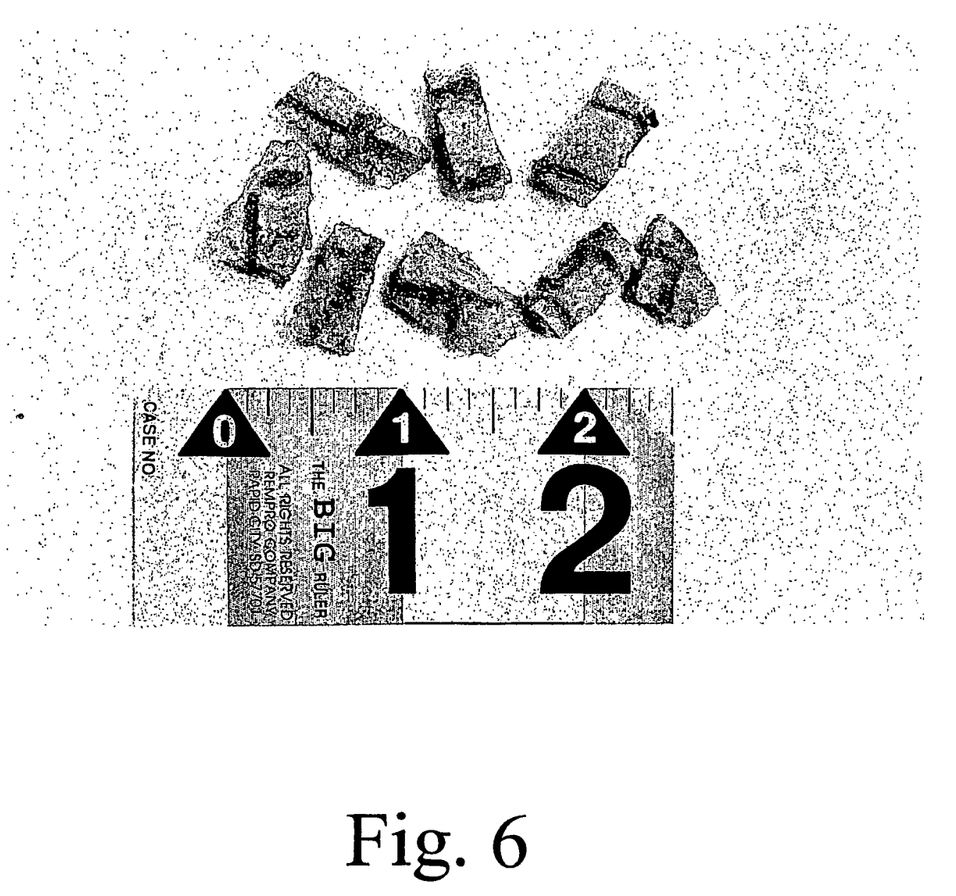
FIG. 6 is an enlarged photograph of a prior art pet food. The pet food in FIG. 6 has been marketed under the brand Pedigree®, Little Champions®, Grilled Cuts in Sauce™ with chicken by Kal Kan Foods, Inc. of Vernon, California. Real grill marks have been seared onto some of the exterior surfaces of this product.

FIG. 6 is an enlarged photograph of a prior art pet food. The pet food in FIG. 6 has been marketed under the brand Pedigree®, Little Champions®, Grilled Cuts in Sauce™ with Chicken by Kal Kan Foods, Inc. of Vernon, California. The base colour of the pet food is generally uniform throughout the individual chunks; however real grill marks or dark lines have been seared onto one of the flat exterior surfaces of some chunks to enhance the appearance of the product. Many of the individual chunks are generally rectangular in shape. On the surface with the dark lines, the base colour fills all of the surface, except where the dark line covers the base colour.

The following examples illustrate the invention. In the examples and elsewhere herein, parts and percentages are expressed by weight, unless otherwise indicated.

EXAMPLE 1

A canned pet food product comprising chunks of emulsion in aqueous gravy was prepared by the following procedure. This product was intended to simulate cut up pieces of beef that were grilled or marinated. Colourant(s) were added through the injector/shredder assembly to the exterior surface of the individual pieces to simulate a piece of meat that was grilled and then chopped. In other words, the product had simulated grill marks, which were dark surfaces on the exterior of some chunks. A brown, reddish base colour gave a generally uniform colour throughout the product, except where the simulated grill marks were located on an exterior surface. The simulated grill marks on the exterior surfaces were darker than the generally uniform base colour of the product. Red iron oxide was the base colour and was applied in an amount of about 0.2% by weight of the emulsion.

With references to FIG. 1, blocks of frozen meat were first cut or broken into pieces about 10 cm in size and the pieces were ground in a conventional meat grinder 28 equipped with a 1 cm plate. The following proportions of meat material were used in this product:

| Meat Type | Parts by weight |
| --- | --- |
| Beef, mechanically separated | 50% |
| Lungs | 35% |
| Liver | 15% |
| Total: | 100% |

| Injection Solution | Parts by weight |
| --- | --- |
| Water | 70% |
| Caramel Colour | 30% |
| Total: | 100% |

The ground meat was introduced into a mixer 30 in which it was heated by steam injection to a temperature of about 0° C. After mixing, the blend of ground meat materials was fed into an emulsion mill 32 in which the meat was cut and sheared to form a meat emulsion which was heated by mechanical working during emulsification to a temperature of between about 15.6° C. to 43° C. The warm meat emulsion was pumped from the emulsion mill into a mixer 34 where it was thoroughly mixed with a blend of dry ingredients containing the dry proteinaceous materials, together with vitamins, minerals and spices to form a thickened, viscous meat emulsion containing about 74% meat material, 26% dry proteinaceous material, and the balance vitamins, minerals and spices. The viscous meat emulsion thus formed was pumped from the mixer into a vacuum-stuffer to deaerate the emulsion.

After deaeration the viscous emulsion, which was at a temperature of about 30° C. to 40° C., was pumped into an emulsion mill 40 in which the emulsion was cut and sheared under conditions to increase the fineness of the emulsion and almost simultaneously heat the emulsion to a temperature of about 110° C. A firm meat emulsion product formed within 2 minutes after heating. The hot emulsion was pumped directly from the emulsion mill into an elongated tube 26 having an internal diameter of 6.35 cm and a length of 6.1 m. The hold tube 26, had a length to diameter ratio of about 30:1, and had an injector/shredder assembly 20 positioned therein to fragment, disrupt and shred the product as it passed through the assembly. This facilitated the formation of individual pieces with irregular surface contours. A liquid solution was injected by the injector/shredder assembly. The liquid solution was about 30% caramel colour and about 70% water by weight. The caramel colour had a negative electrical charge and was BC 145 (commercially available from Sethness Products Co. of Chicago, Ill.). The injector/shredder assembly 20 was placed in the elongated hold tube 26 to fragment, disrupt and shred the product and inject the aqueous colour solution while the product moved through the tube. The colour solution was injected at a level of about 8% of the product flow. The flow rate of the emulsion through the tube was controlled to provide the emulsion with a residence time of about 2 minutes in the tube.

An additional cutting system 44 in the form of a rotary cutter was positioned at the discharge end of the elongated hold tube 26 to cut the product into individual pieces which had irregular exterior surface contours in the form of meat-like pieces or chunks varying in length from about 1.2 cm to about 5 cm or more. They had randomly located darkened—even blackened—patches, resembling grid marks from a hot grill. The individual chunks discharged from the tube were at a temperature of about 99° C. and had a moisture content of about 56%. The resulting meat emulsion pieces were filled into flexible pouches and were sealed and retorted under conditions sufficient to provide a commercially sterile product. After retorting, the pouches were allowed to cool to room temperature and stored for a month before being opened. The pieces retained their shape, integrity, and grilled meat-like appearance and texture.

EXAMPLE 2

This example describes preparation of a fish-like product with exterior colour added through the injector/shredder assembly to simulate a piece of fish that was grilled and then chopped. In other words, the product had simulated grill marks, which are dark surfaces on the exterior of some chunks. The final product was prepared in aqueous gravy. An orange/reddish base colour gave a generally uniform salmon-like colour throughout the product except where the simulated marinated or grill marks were located on an exterior surface. Red and yellow iron oxides were the base colour and were applied in an amount of about 0.2% by weight of the emulsion. This base colour was added at the beginning of the mixing process to give a generally uniform colour throughout the product.

The procedure described in Example 1 was repeated, with the exception that the following proportions of meat material were used:

| Meat Type | Parts by Weight |
| --- | --- |
| Fish | 45% |
| Liver | 15% |
| Lung | 25% |
| Chicken | 15% |
| Total: | 100% |

| Injection Solution | Parts by Weight |
| --- | --- |
| Caramel colour | 15% |
| Water | 85% |
| Total: | 100% |

EXAMPLE 3

This example describes preparation of a meat-free product with colourant added through the injector/shredder assembly. The product is intended to simulate chopped pieces of fish that are grilled or marinated. In other words, the product should have a generally uniform colour throughout with the presence of simulated grill marks on exterior surfaces. Base colours are added to the initial formula to produce a generally uniform colour through the product. In this example, an orange/reddish base colour may be added to a simulated salmon product.

The resultant pieces are irregularly shaped with a layered internal texture resembling the flaked structure of salmon. They have an orange/reddish-coloured hue and blackened patches over the exterior surfaces, except where surfaces have been divided by a rotary cutter external to the holding tube.

| Vegetable Protein | Parts by weight |
|---|---|
| Wheat Gluten | 30% |
| Vegetable oil | 7% |
| Water | 63% |
| Total: | 100% |

| Liquid Injection Solution | Parts by weight |
|---|---|
| Caramel Colour | 35% |
| Water | 65% |
| Total: | 100% |

The ingredients are introduced into a mixer. The ingredients are heated by steam injection to a temperature of about 27° C. The viscous, emulsion-like mixture thus formed is pumped from the mixer into a vacuum-stuffer for deaeration.

After deaeration, the viscous mixture, which is at a temperature of about 32° C., is pumped into an emulsion mill in which the viscous mixture is processed to heat it very quickly to a temperature of about 107° C. At such an emulsion temperature, protein coagulation proceeds very rapidly, so that a firm product is formed within 2 minutes after heating. The hot emulsion-like mixture is pumped directly from the emulsion mill into an elongated tube having an internal diameter of 6.35 cm and a length of 6.1 m. An injector assembly is positioned about 30% of the distance along the tube and a fragmenter/shredder assembly is positioned at about 60% along the elongated hold tube to disrupt, fragment and shred the product as it moves through the tube and inject liquids including colour. The liquid solution is about 35% colour and about 65% water by weight. The flow rate through the tube is controlled to provide a residence time of about 2 minutes in the tube.

A firm product is continuously discharged from the elongated hold tube. A rotary cutting blade is positioned at the discharge end of the elongate hold tube to cut the product into individual pieces which have irregular exterior surface contours in the form of meat-like pieces or chunks mostly varying in length from about 1.5 cm to about 6 cm or more. The individual chunks discharged from the tube are at a temperature of about 99° C. and have moisture content of about 55%. The resulting chunks or pieces are filled into sterilizable transport packages and are sealed and retorted under conditions sufficient to provide a commercially sterile product. After retorting, the pieces retain their shape, integrity, and meat-like appearance and texture.

Although the present invention has been described with reference to specific examples and preferred embodiments, it will be understood that changes, modifications and variations of composition and procedure may be made within the principle and scope of the invention as set forth in the appended claims.

The invention claimed is:

1. A process for producing a pet food comprising:
    mixing a protein source to produce an emulsion;
    heating said emulsion above the boiling point of water;
    pressurizing said emulsion in a confined pressurized zone;
    disrupting the emulsion mechanically in said confined pressurized zone using an injector/shredder assembly to form individual pieces or chunks of pet food having irregular exterior surface contours;
    coloring said exterior surface contours in said confined pressurized zone by utilizing the injector/shredder assembly to inject negatively charged colorant into the emulsion to adhere the colorant to the exterior surface contours; and
    discharging said individual pieces or chunks of pet food.

2. The process of claim 1 wherein said protein source comprises at least one source selected from the group consisting of a vegetable source, a meat source, and a meat by-product source.

3. The process of claim 2 wherein said vegetable source comprises at least one source selected from the group consisting of a soy source, a corn source, a rice source, a peanut source, a sunflower source, a linseed source, a canola source, and a wheat source.

4. The process of claim 2 wherein said meat source comprises at least one source selected from the group consisting of a beef source, a chicken source, a fish source, and a pork source.

5. The process of claim 4 wherein said meat source contains from about 15% to about 25% fat by weight.

6. The process of claim 4 wherein said meat source contains less than 15% fat by weight.

7. The process of claim 1 wherein the emulsion has a protein to fat ratio of at least 1.5:1.

8. The process of claim 1 wherein said emulsion is heated to a temperature between about 104° C. and about 118° C.

9. The process of claim 1 wherein said emulsion has a moisture content from about 45% to about 80% by weight.

10. The process of claim 1 wherein said confined pressurized zone is at least one of an elongated tubular member and a holding tube.

11. The process of claim 10 wherein the emulsion is restricted in said holding tube for a predefined period of time.

12. The process of claim 10 wherein the emulsion is contained in said holding tube having a pressure above the vapor pressure of said emulsion.

13. The process of claim 12 wherein the emulsion is retained in said holding tube under a pressure greater than its vapor pressure until the protein in said emulsion has coagulated to form a firm emulsion.

14. The process of claim 1 wherein said injector/shredder assembly comprises at least an injector assembly and a shredder assembly.

15. The process of claim 14 wherein said injector assembly comprises a means of injecting steam to disrupt the emulsion.

16. The process of claim 1 wherein said colorant comprises at least one colorant selected from the group consisting of an oil based colorant and a water-soluble colorant.

17. The process of claim 16 wherein said colorant further comprises at least one component selected from the group consisting of a flavor and a nutrient.

18. The process of claim 1 wherein said colorant is negatively charged with respect to the emulsion.

19. The process of claim 18 wherein said colorant comprises a water soluble, caramel color having a negative charge with respect to the emulsion.

20. The process of claim 1 wherein said colorant is capable of adhering to the emulsion without the presence of a binder.

21. The process of claim 1 wherein said discharging step comprises the step of removing said emulsion from said confined pressurized zone and cutting said colored emulsion in pieces of varying size, shape and color.

22. The process of claim 21 wherein said colored emulsion has a moisture content from about 50% to about 65% by weight.

23. A process for producing a pet food comprising:
mixing a protein source to produce an emulsion;
heating said emulsion above the boiling point of water;
pressurizing said emulsion in a confined pressurized zone;
disrupting the emulsion in said confined pressurized zone to form individual pieces or chunks of pet food having irregular exterior surface contours;
coloring said exterior surface contours in said confined pressurized zone by adhering a colorant to the exterior surface contours, wherein the colorant is negatively charged with respect to the emulsion; and
discharging said individual pieces or chunks of pet food.

24. The process of claim 23 wherein said colorant comprises a water soluble, caramel color having a negative charge with respect to the emulsion.

25. A process for producing a pet food having a layered, meat-like appearance and chunky, irregularly-shaped, individual pieces having a darkened exterior surface to simulate grill marks which comprises:
passing a product mass through a confined processing zone;
disrupting the product mass in the confined processing zone to form individual pieces or chunks of pet food having irregular exterior surface contours; and
contacting at least a portion of the exterior surface contours of the pieces or chunks with a colorant while in the confined processing zone, wherein the colorant is negatively charged with respect to the product mass to promote adhesion of the colorant to the product mass.

26. The process of claim 25 wherein said product mass consists of an emulsion comprising at least one source selected from the group consisting of a meat source and dry proteinaceous source.

27. The process of claim 25 wherein said product mass comprises less than 15% fat by weight.

28. The process of claim 25 wherein said product mass has a moisture content from about 50% to about 65% by weight.

29. The process of claim 25 wherein said colorant adheres to the emulsion without the presence of a binder.

30. The process of claim 25 wherein said colorant is selected from the group consisting of water-soluble colorants and oil soluble colorants.

31. The process of claim 25 wherein said colorant comprises a colored solution, which comprises from about 30% to about 60% colorant by weight and from about 70% to about 40% water by weight.

32. The process of claim 31 wherein said colored solution is injected into said confined processing zone at a pressure that is higher than the pressure inside said confined zone and at a flow rate from about 1% to about 20% by weight of the product mass flow rate.

33. The process of claim 25 wherein said confined processing zone comprises a holding tube under a pressure greater than its vapor pressure and the process comprises maintaining the pressure until the protein in said emulsion has coagulated to form a firm emulsion.

* * * * *